United States Patent [19]
Winston et al.

[11] Patent Number: 5,410,125
[45] Date of Patent: * Apr. 25, 1995

[54] METHODS FOR PRODUCING INDICIA ON DIAMONDS

[75] Inventors: Ronald H. Winston, Scarsdale; Necip Alev, Bronxville, both of N.Y.

[73] Assignee: Harry Winston, S.A., Geneva, Switzerland

[*] Notice: The portion of the term of this patent subsequent to Sep. 22, 2009 has been disclaimed.

[21] Appl. No.: 770,446

[22] Filed: Oct. 8, 1991

Related U.S. Application Data

[63] Continuation-in-part of Ser. No. 595,861, Oct. 11, 1990, Pat. No. 5,149,938.

[51] Int. Cl.⁶ .................. B23K 26/00; B23K 26/06
[52] U.S. Cl. .................... 219/121.69; 219/121.68; 219/121.71; 219/121.73
[58] Field of Search ............ 219/121.68, 121.69, 219/121.7, 121.71, 121.73, 121.75

[56] References Cited

U.S. PATENT DOCUMENTS

| | | | |
|---|---|---|---|
| 3,114,966 | 12/1963 | Fell | 29/401 |
| 4,248,577 | 2/1981 | Bory et al. | 425/131.5 |
| 4,467,172 | 8/1984 | Ehrenwald et al. | 219/121.69 X |
| 4,534,934 | 8/1985 | Cho | 419/6 |
| 4,703,672 | 11/1987 | Ekkelboom | 76/107 |
| 4,842,782 | 6/1989 | Portney et al. | 219/121.69 X |
| 4,912,268 | 3/1990 | Daniels et al. | 219/121.69 |

FOREIGN PATENT DOCUMENTS

| | | |
|---|---|---|
| 81110279.7 | 6/1982 | European Pat. Off. |
| 57089 | 4/1979 | Israel |

*Primary Examiner*—Mark H. Paschall
*Attorney, Agent, or Firm*—Darby & Darby

[57] ABSTRACT

A method of producing a marking on diamond, pearl, precious or semi-precious stone. For producing the marking, the region on the surface to be marked is irradiated with an ArF excimer laser whose output beam is passed through a mask which defines the marking. Identification or security marks may be created. The same process can be used to produce strong and durable extrusion dies having irregular cross sections, and cross sections which vary with depth through the die material.

31 Claims, 2 Drawing Sheets

METHODS FOR PRODUCING INDICIA ON DIAMONDS

RELATED APPLICATIONS

This application is a continuation-in-part of application Ser. No. 07/595,861, filed on Oct. 11, 1990, now U.S. Pat. No. 5,149,938.

BACKGROUND OF THE INVENTION a. Field of the Invention

This invention relates to the creation of identification marks of other visible or invisible (but detectable) indicia on diamonds, for the purposes of quality control, consumer brand identification, security or any other purpose requiring identification of a stone.

The invention also relates to treating objects made of very hard materials, in particular, diamonds, with an excimer laser or other ultraviolet laser energy source, for a number of purposes. An aspect of the manufacture of die inserts made of diamond or other similar hard material and having a complete cross-section of the extrusion opening, for example, die inserts used in spinnerets, die assemblies for extruding wires, glass or synthetic fibers.

Another aspect of the invention relates to the creation of electrical circuit patterns, which may be microcircuit patterns, on diamond or other similar hard materials which are difficult or practically impossible to etch with chemicals.

b. Description of the Pertinent Technical Arts

As the present invention encompasses treating or processing different types of objects, i.e., diamonds or other hard materials used in the production of jewelry items, and die inserts also made diamond or the like, the latter used in extrusion dies, the technical arts relating to these two types of objects and laser processes will be considered separately.

Luxury items such as jewelry and consumer goods alike are most often provided with an identifying mark from which the source of the goods can be identified. This is especially important in the case of a product whose quality and value can only be determined by specially skilled workers. Such identifying marks must be on the goods in a permanent form. On the other hand, the indicia should not impair the value of the goods in any way.

In the case of precious stones such as diamonds, there has long been a need for a reliable method by which the identity of a stone could be uniquely determined. Such a method would aid in locating and recovering specific pieces of lost or stolen jewelry. Furthermore, where diamonds are loaned on a temporary basis, as is not uncommon, permanent indicia on the stone would facilitate ensuring that the returned stone is identically the same as the loaned stone.

In addition, such detection systems or indicia could serve to indicate the level of quality or craftsmanship of the faceting, cutting and polishing of the stone. In essence, a permanent mark or detectible indicium on a diamond may serve as a hallmark or trademark in much the usual fashion, i.e., as an identification of source. Such a mark may be employed in dispelling the common misunderstanding that diamonds are essentially fungible, for any given weight, color and clarity. In fact, the quality of the gemstone may be markedly affected by the skill and care of the stoneworker in the selection, sawing, girdling, cutting and polishing processes.

There have been devised a number of processes for marking diamonds, such as are disclosed in U.S. Pat. Nos. 4,467,172 and 4,392,476, which entire disclosures are incorporated herein by reference. In each of these patents, lasers are disclosed for creating focussed spots of laser energy on or in the diamond to be marked, wherein the desired indicia are formed by creating series or patterns of dots with such focussed spots of energy.

The aforementioned laser marking systems employ YAG or Nd:YAG lasers operating at 1.06 microns wavelength, alone or in conjunction with frequency doublers. Thus the disclosed laser radiation incident on the diamond is at either 1.06 or 0.532 micron wavelength. As recognized in U.S. Pat. No. 4,467,172, laser energy at 0.532 microns wavelength can penetrate the surface of a diamond and can heat and vaporize portions of material below, as well as at, the diamond surface. This penetration of energy is undesirable and poses undue risks of fracturing the stone as a result of internal heating of the crystal structure. The prior art systems thus include complex arrangements to precisely control the amount of laser energy delivered so as to prevent damage to the diamonds being thus marked.

In addition, because diamond is substantially transparent or transmissive at the aforementioned wavelengths, such prior diamond marking processes generally involve the application of energy absorbing coatings such as carbon black to the surface to be marked, further complicating the procedure.

Moreover, since the indicia are formed by multiple overlapping spots, complex and expensive computer-driven X-Y tables are provided in the aforementioned prior art systems for accurately positioning the diamond with respect to the focussed spot of laser energy to be next applied. The need to create numerous spots to form a single mark further causes the prior art marking processes to be relatively slow in operation.

In the case of creating indicia on other precious and semi-precious stones, pearls and other luxury jewelry items and the like, it is known that the aforementioned prior art methods for creating indicia on diamond may be used with some success. However, the energy intensity at the focussed spot of the Nd:YAG laser is known to cause microcracks in the stones, pearls or other material being marked.

An arrangement for producing an indicium or trademark on glass spectacle lenses is disclosed in U.S. Pat. No. 4,912,298, entitled "Method For Producing A Marking On A Spectacle Lens," the entire disclosure of which is hereby incorporated by reference.

It is also known to employ lasers for producing extrusion openings in die inserts used in extrusion die assemblies. Using lasers for producing extrusion openings is disclosed, e.g., in U.S. Pat. Nos. 4,703,672 and 4,534,934.

SUMMARY OF THE INVENTION

Accordingly, it is an object of the invention to provide an improved method for producing an identifying mark on a diamond. It is a more specific object of the invention to provide such a method which permits relatively rapid marking of diamonds without the need for expensive computer-driven X-Y tables.

It is a further object of the invention to provide a method of marking a diamond which entails a significantly reduced risk of damaging the stone.

Another object is to apply photolithograhic techniques to a diamond marking process so as to obtain markings of varying gray shades, rather than black-and-white only.

Another object of the invention is to provide a simple process for providing a "branded" diamond whose source, and thus quality of workmanship, could be relatively easily determined upon inspection.

Yet another object is to provide on diamonds identifying marks of superior line definition than is presently possible with current processes.

It is still another object of the invention to provide more complex arrangements for providing visible or invisible indicia on a diamond for security purposes.

Another object is to provide a method of marking pearls, or precious or semi-precious stones which method entails a significantly reduced risk of damaging the item being marked.

It is still further object of the invention to provide a method of producing die inserts having a complex cross-section of the extrusion openings thereof.

A further object is to provide a method of producing die inserts with which such cumbersome operations of treating the extrusion passages such as finishing, polishing, de-burring and the like are eliminated or significantly reduced.

One method according to the invention involves marking a diamond with a pulsed source of laser energy in the ultraviolet region of the spectrum. A preferred source of energy is an excimer laser.

Excimer lasers are pulsed gas-discharge lasers. In these lasers, a gas mixture (for example, argon and fluorine) is energetically charged and, upon sufficient charging, is caused to produce an intense emission of pulsed laser energy. Excimer lasers are conventionally used to produce a pulse or a plurality of pulses at wavelengths ranging from approximately 193 nanometers (nm), or 0.193 microns, to about 351 nm, depending on the particular rare-gas-halide excimer produced.

Argon fluorine excimers produce laser energy at 193 nm. For radiation at this wavelength, the depth of penetration into pure diamond is very minimal. While diamond is highly energy transmissive across a broad wavelength spectrum, pure diamond has particularly low transmissivity, low reflectivity and high absorption at about 193 nm, which corresponds to nearly the cutoff frequency of the crystal. For this reason, the excimer laser energy is taken up in a particularly thin surface layer which is rapidly brought to a high temperature. A thin layer of material in the range of from several angstroms to several microns is in this way vaporized from the surface by each pulse, or alternatively may be partially graphitized by each pulse of the excimer laser. Vaporization of material serves to protect the stone from overheating because of the high energy of sublimation for diamond carbon.

It is known by those skilled in the art that diamonds are rarely "pure" crystals. Instead, impurities in the form of nitrogen atoms substituted into the crystal structure exist in almost every stone. The cutoff frequency of a given diamond increases with increasing presence of nitrogen impurities, and may range as high as 300 nm. Therefore, while the preferred embodiment is described in terms of use of an ArF excimer laser, other lasers may be suitably employed, wherein laser energy having wavelengths ranging from under 200 nm to about 300 nm can be provided. These include, in the ultraviolet range, krypton fluorine excimers (248 nm), xenon chlorine excimers (308 nm), and xenon fluorine excimers (351 nm). The most effective laser wavelength for a given stone will always depend on the purity of that diamond.

Thus, it will be understood the "about 193 nm" as used herein is meant to embrace a range sufficient to include the cutoff frequency of any given stone, i.e., from about 190 nm to about 350 nm.

In the methods for creating indicia on pearls, precious and semi-precious stones, it will be understood by those skilled in the art that the foregoing discussion concerning cutoff frequencies is not directly applicable.

It is especially advantageous to irradiate diamond through a mask which contains a form of the mark or indicium as a cutout or other area of high transmissivity. Such masks can be mounted on or in front of the diamond. The spacing of the mask from the diamond surface is not critical because of the parallel radiation beam produced by an excimer laser, unless reduction optics are also employed, in which case the position of the mask is necessarily important. Masks may also be fabricated with areas having different transmissivities to laser energy at the desired wavelength, yielding marks with areas of differentiated contrast selected from a generated gray scale.

Another beneficial aspect of the invention resides in the ability to modify or change the mask pattern between laser pulses, or between groups of pulses, so as to "animate" a sequence of patterns on the material to be irradiated. In the case of irradiating diamond, because the laser energy vaporizes a certain thickness of material with each pulse or group of pulses, an extrusion die having a bore of axially varying cross-sectional shape may be obtained.

For example, a pyramidal hole has been created through a section of diamond. A spiralling hole may easily be created as well as a limitless number of differently shaped holes. With the use of appropriate optical elements, it is also possible to create other highly complex, three-dimensional shapes in a diamond crystal.

It is still more advantageous to image the mask on a surface of the diamond through optical means which passes ultraviolet radiation, e.g., sapphire or fused quartz or fused silica. If the image to be produced is first reduced, a high energy density is obtained on the surface of the diamond and therefore a lesser number of pulses or a reduced output capacity of the laser is required.

Another method according to another embodiment of the invention involves the use of an excimer laser to infuse various detectible substances into the surface of a diamond. Where a diamond is to be marked with indicia which are invisible to the naked eye, i.e., primarily for security purposes, it is obviously more difficult to subsequently locate the mark for identity verification. Excimer laser energy can be used to "force" or infuse certain materials, such as fluorescent dyes and other inorganic compounds which fluoresce in the ultraviolet range, into the surface of the diamond crystal structure. A mark created on a diamond which has first been coated with such a dye or material will fluoresce under appropriate lighting conditions, thus making it easier to locate the mark which would otherwise ordinarily be invisible to the naked eye.

Alternatively, other detectable materials such as conductive or magnetic substances may also be so deposited on or into the diamond, for subsequent detection.

BRIEF DESCRIPTION OF THE DRAWINGS

The invention will now be described with reference to the accompanying drawings wherein.

DESCRIPTION OF THE PREFERRED EMBODIMENTS OF THE INVENTION

The methods of the present invention will be discussed separately as applied to producing indicia on diamond and other hard materials, and then to forming extrusion openings in die inserts.

Figure 1:
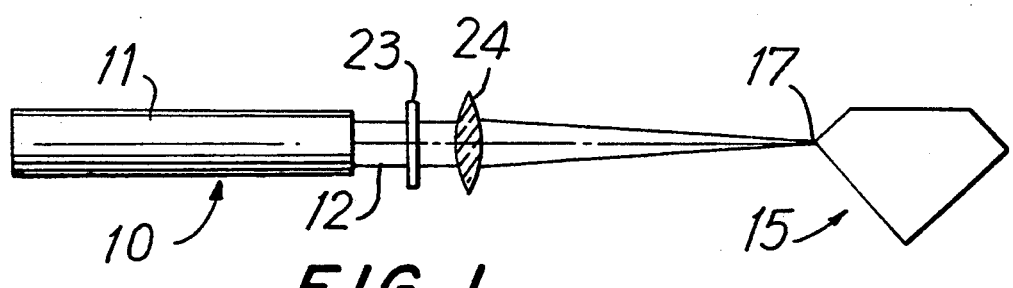
FIG. 1 is a partially schematic perspective view of an arrangement for creating indicia on a diamond with an excimer laser.

FIG. 1 generally illustrates an arrangement 10 for providing indicia on a diamond 15. A conventional argon fluorine excimer laser 11 provides pulsed laser energy for use in the methods of the invention. Such excimer lasers are commonly available from a number of commercial sources. One such supplier is Lambda Physik Inc., a West German company having offices in Acton, Massachusetts, which sells such lasers under the designations "LPX 100" and "LPX 200" Series. Another such supplier is Questek, Inc. of Billerica, Mass. which markets an excimer laser under the designation "Series 2000".

The argon fluorine excimer laser 11 produces a laser output 12 at 193 nm wavelength having a flat-top beam profile (in horizontal cross-section) which propagates in a parallel beam path, when such laser 11 is provided with appropriate conventional resonator optics as is known. The output beam 12 is directed to pass through a mask 23 in order to produce a beam configured to produce a specific mark, as opposed to the conventional excimer beam of generally rectangular cross section. A portion of the laser radiation is stopped by the mask 23 and only in those regions which correspond to the form of the desired mark is the radiation of the laser allowed to pass through the mask.

After passing through the mask 23, more details of which will be described later, the beam is directed to reduction optics 24, which may be a 10:1 reduction lens suitable for use with laser energy at 193 nm, such as a lens fabricated of fused silica or sapphire. Surface lenses of any other desired demagnification value, such as 30:1, may be used as appropriate.

The reduction lens 24 serves to focus the beam to a size which is small enough so that the mark produced on the edge or girdle 17 of the diamond does not significantly impair the value of the stone. The mark produced according to the invention is preferably so small that it is essentially invisible to the naked eye. The focussed beam impinges upon the surface of the diamond 15 and effects a small removal in the form of the desired mark. The low wavelength of the laser output energy enables marks of exceedingly high line resolution to be created in the described manner. Moreover, the resolution is so fine that a mark may even be created on the culet of the stone. In practical terms, surface details of about one micron resolution have been achieved.

Because diamond is essentially opaque to laser radiation at about 193 nm wavelength, the laser energy is absorbed only at the outermost surface portion of the stone. The rapid absorption of energy causes the entire image to be formed with only one or a relatively few energy pulses, such as several or several tens of pulses. The required output energy (or fluence) of the excimer laser beam may range from a few to several tens or more milliJoules per square centimeter, with the precise energy output necessary for a given application depending on the size of the mark to be produced, the degree of optical reduction of the beam, and the desired depth of the mark to be created (i.e., the amount of material to be vaporized).

The necessary "damage threshold" for diamond is in the range of 6–16 Joules per square cm at the surface of the stone. The particular damage threshold in this range for any given diamond depends primarily upon the nitrogen content of the stone, varying in an inverse relationship.

The diamond may be held in a single fixed position during the entire marking process and accordingly there is no need in this embodiment of the invention for a complex and expensive computer-controlled X-Y table or any other expensive or complex positioning means such as those described in U.S. Pat. Nos. 4,392,476 and 4,467,172. These prior art systems must scan the surface to be marked with individual pulses, each creating only a minute portion of the image at any given moment.

As already stated, a small amount of material may be removed by vaporization from the surface of the diamond. In addition, remaining portions of the diamond material may also be heated sufficiently to "graphitize" or undergo an allotropic transformation from one form of elemental carbon, i.e., diamond, to another, e.g., graphite. It is known that at sufficiently high temperatures, e.g., about 900° C., diamond will transform into graphite and the entire diamond crystal lattice will decompose. Before such decomposition occurs, however, it appears that the material may transform or partially transform into graphite while retaining the strength and durability of the diamond crystal lattice configuration.

It is believed that the diamond may undergo such a conversion within the crystal structure or at its surface, as it has been found that darkened or "graphitized" regions cannot be removed with conventional acid washes which would normally remove graphite from the surface of a diamond. Thus, a completely permanent mark is formed. In effect, diamond is treated as a photosensitive material according to the principles of the invention.

For a plot of surface damage versus beam energy density, it is known that this curve for diamond is theoretically a step function. Below a lower threshold value no damage occurs, while above an upper threshold no further damage is done, regardless of energy applied. In practice, it has been observed that there is a very narrow transition zone in which surface damage, e.g., graphitization, can be selectively controlled by carefully and minutely adjusting the excimer laser energy output. By so controlling the laser, marks having different degrees of opacity, i.e., a "gray scale, can be produced.

Further advantageous is the fact that the laser energy at about 193 nm wavelength does not penetrate into the crystal structure. Internal heating of the crystal is thus avoided, such heating being a significant cause of diamond fracture in prior art diamond marking schemes employing laser energy.

At least one prior art method required an additional step of applying a coating of an energy absorbing material such as carbon black to the surface of a diamond before carrying out any laser marking. The success of this prior technique depended at least in part on the uniformity and density of the energy absorbing coating on the diamond surface, and this dependency is entirely eliminated by the present invention. In practice, it may be desirable to apply a coating of an energy absorbing material merely to initiate vaporization at the surface of the stone. Once started, the removal of material continues without further intervention.

Permanent marks on the surface of a diamond have been created according to the foregoing described embodiment of the invention. Marks in the form of english letters, Japanese characters and various geometric and non-geometric designs having dimensions on the order of a few hundred microns wide by a few hundred microns high were formed by application of from 1 to 10 pulses of an ArF excimer laser.

It has been further discovered by the present inventors that the process described above may advantageously be applied to other precious and semi-precious stones or the like, despite the different physical properties of such materials. In particular, emeralds, rubies, sapphires and even pearls may be marked without unduly damaging such materials or otherwise reducing their value as jewels.

Materials such as ruby and emerald differ from diamond in at least one important way. When localized intense heating is provided by means of Nd:YAG or $CO_2$ laser, the heat is not readily conducted away from the heated portion to other portions of the material. As a result, it is known that micro-cracks are caused to form in the stone at and near the mark. Such micro-cracks may weaken the stone to an unacceptable degree.

When the excimer laser marking process according to the invention is employed to mark rubies, emeralds, other colored stones, and even pearls and the like, the incidence of micro-cracking has surprisingly been found to be substantially reduced or eliminated. Material is removed as in the case where diamond is being marked, but no blackening is observed in these other materials. Some debris may also remain, and the mark may be more difficult to visually perceive than in the case of diamond. Nonetheless, a highly advantageous method for providing identifying indicia on colored stones, pearls and the like is provided.

It will be understood hereinafter that the detailed description is intended to be generally applicable.

Figure 2:
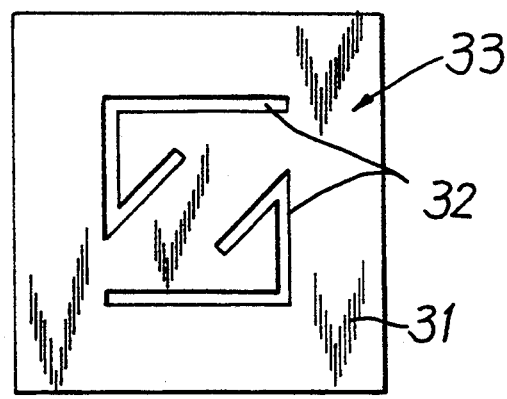
FIG. 2 is a plan view of a diamond bearing on identifying mark.

FIG. 2 illustrates a mask 33 used to form a particular image on a diamond according to the invention. The mask is constructed of any suitable material 31 sufficiently strong to withstand the excimer laser energy without itself vaporizing. The mask 33 includes cut-out areas 32 in the pattern of the desired mark.

In an alternative embodiment, the mask comprises a plate of fused quartz, fused silica or sapphire, coated with a suitably opaque and heat-resistant material, such as a photoresist or etched chrome coating. The mask may be prepared so as to have areas which are not coated with the opaque material or which are only diffusely so coated. By controlling the density of the coating on the mask as selected areas thereof, a mask having areas of different transmissivities is provided. Such a mask may advantageously be used to produce a mark having predetermined areas of differentiated contrast, i.e., different gray shades, as explained hereinabove.

Figure 3:
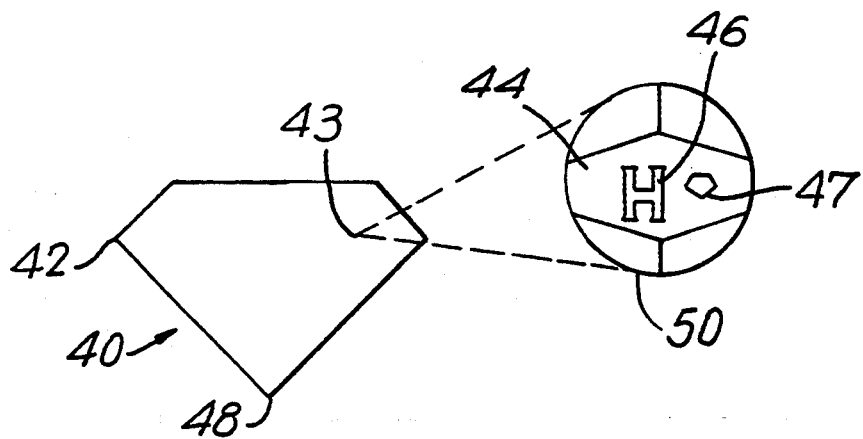
FIG. 3 is a side view of a diamond bearing an identifying mark.

FIG. 3 shows a diamond 40 having been marked at a particular circumferential location 43 on the girdle 42. The girdle 42 customarily includes numerous small facets such as the facet 44 shown in the enlarged view 50 of the girdle 42, any of which is suitable for discreetly placed markings. It will be understood that the methods of the present invention are equally well applied to polished and unpolished, i.e., rough finished, diamond surfaces alike. While markings may be created anywhere on a diamond, it is aesthetically preferable to create such markings only on minor facets of the stone. The present method may even be advantageously used to place a mark on the culet 48 of the stone 40.

As shown in FIG. 3, the laser-created indicia include a letter "H" 46 and a smaller representation of a diamond 47. As described above, these marks 46, 47 may either be of equal or differing depths and/or contrasts, even when produced at the same time by the same excimer laser pulses.

In an alternative embodiment of the invention, the same apparatus and process steps as just described are repeated, but the diamond is first coated at the location to be marked with a substance having special properties, such as fluorescence or phosphorescence. When a mark, especially a mark which is so small that it is invisible to the naked eye, is created on a diamond, it may often be difficult to subsequently find the mark in the first place. This would undermine the value of the mark as a means for additional security in instances where the diamond must be relatively quickly identified. A fluorescing mark could more easily be located and inspected, given the appropriate lighting conditions, e.g., ultraviolet, and is thus a desirable feature of a method for marking diamonds.

When the excimer laser energy impinges the coated surface of the stone, a significant number of molecules of the coating remain at the area of the mark and are adhered to or infused into the surface of the diamond, without having been vaporized. The precise mechanism of this action is not understood at this time. Nonetheless, when materials such as zinc sulfide or diethyl zinc in combination with gaseous sulfur compounds are employed or deposited as coating the marks so produced according to the invention, they can be located only under lighting conditions (ultraviolet) which cause the mark to fluoresce in a preselected, extremely narrow frequency band, thus aiding in the prevention of unauthorized detection.

In addition, such deposition and/or alloy combining of metals or volatile metal compounds with diamond carbon, such as arsine, phosphine, iron or iron carbonyl, and nickel or nickel carbonyl, at the surface of the diamond can produce magnetically detectable indicia, i.e., diffused or decomposed metal and/or metal carbides catalyzed by the laser on the indicia. Such deposition of other substances such as titanium carbide or molybdenum carbide could produce other electrically detectable indicia. Similarly, diborane or any other gaseous or solid compound elements, could cause profusion of substances to create electron junctions to cause a change in electrical properties, i.e., in a manner similar to doping of silicon to produce npn and/or pnp semiconductors.

Thus a range of optical, magnetic or electrical properties could be engendered.

It may be advantageous in some circumstances to create a series of precisely spaced circumferential marks according to this alternative embodiment, wherein an electronically readable, unique "signature" may be defined for a stone. For example, the stone could be rotated at a predetermined speed and the magnetic marks electronically detected by a fixed counter or similar device. The counter output would provide a distinctive signal pattern which could be maintained as a secret by the owner of the diamond. Given the existence of sufficiently accurate measuring systems, it would be particularly difficult for a would-be thief to "forge" the correct pattern of marks on a different stone.

Such advantageous marking of diamonds is entirely novel and the range of uses for such marks is not completely exhausted by this brief description, which is illustrative only.

It is also known that diamond may be "created" by thin film chemical-vapor-deposition (CVD) techniques. It may be advantageous in certain cases to sandwich an identification mark between the natural stone and a superficial CVD layer of diamond for added security.

It will be understood that the foregoing description is that of the preferred embodiments of the invention and that various changes and modifications may be made thereto without departing from the spirit and scope of the invention as defined in the appended claims. For example, the mask 23 in FIG. 1 is shown as being position between the laser 11 and the reduction lens 24, yet the mask 23 could also be located between the lens 24 and the diamond 15 to be marked, although the illustrated position is preferred. When the reduction lens 24 is not used, the position of the mask 23 may range from just at the output of the laser 11 to adjacent the stone 15, without any significant effect on operation.

Another improvement in performance is obtained with the use of a beam homogenizer before the mask, as is well known to those skilled in the art.

As noted above, some diamonds may be more advantageously marked according to the invention by using KrF, XeCl or XeF lasers. Alternatively, any laser source capable of delivering sufficient energy at the appropriate wavelength would suffice.

As it has already been indicated the excimer laser can also be used for producing extremely fine complex patterns in the production of diamond plate extrusion dies such as for use in extruding metal wire, glass fiber or synthetic fibers. By repetitively pulsing the excimer laser, thin diamond plates may be essentially "drilled" with the resulting hole in the form of the mask, after reduction.

This permits creation of fabrics having new and as yet unappreciated qualities. For example, fibers having uniquely high nap could be produced and then woven into new materials having applications such as filters, substrates or insulators. A particularly advantageous use of the invention is the creation of fibers, such as extruded glass fibers, having cross sections which possess great strength for their weight. For example, high resolution I-beam cross sectioned fibers may be obtained which, when blow-molded or otherwise formed into solid shapes, would have extraordinary strength characteristics for their size and weight. Almost any cross-section could be obtained for an extruded material, at extremely high resolution of surface features.

Moreover, the die could be "drilled" in the direction of greatest strength of the diamond. Particularly strong and durable dies are thus obtainable according to the basic principles of the present invention.

Of course, the die inserts can be made of a hard material other than diamond, i.e., such as sapphire and the like, as explained hereinabove.

Figure 4:
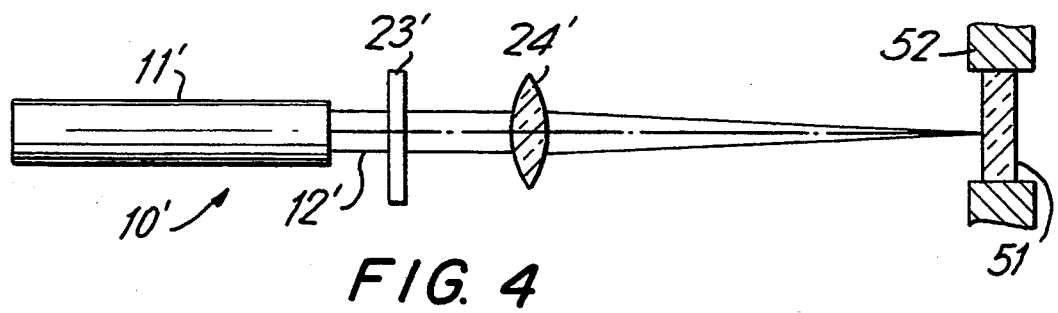
FIG. 4 is a partially schematic view of an arrangement for producing a complex cross-sectional extrusion opening in a die insert made of a hard mineral.

An arrangement for producing die inserts is shown in FIG. 4. The illustrated arrangement is substantially similar to the arrangement shown in FIG. 1 for creating security indicia, and the like elements in FIG. 4 are designated with the same numerals as in FIG. 1 with a prime. The arrangement 10' shown in FIG. 4 comprises an excimer laser 11' which may be identical to the excimer laser 11 shown in FIG. 1 and an output 12' of which is directed to pass through a mask 23' having a cross-section corresponding to the cross-section of the extrusion opening of the die insert. Only a portion of the laser radiation that corresponds to the shape of the extrusion opening passes through the mask.

After passing through the mask, the beam is directed to reduction optics 24', which may be a suitable reduction lens insuring obtaining an extrusion opening of a predetermined size. The reduction lens 24' focuses on the beam on the die insert 51 which may be similar to the die insert (5) shown in U.S. Pat. No. 3,114,966 incorporated herein by reference thereto. The insert 51 is supported in an appropriate mounting 52.

The extrusion opening in the die insert 51 is formed with an appropriate number of energy pulses which would depend on the output energy of the selected excimer laser and the thickness of insert itself.

Figure 5A:
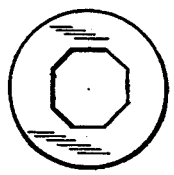
FIGS. 5a–5c are plan views of hard mineral die inserts showing various complex cross-sections of extrusion openings.
Figure 5B:
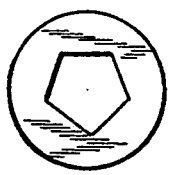
Figure 5C:
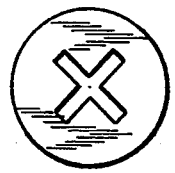
Figure 6A:
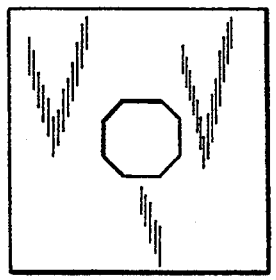
FIGS. 6a–6c are plan views of masks for producing extrusion openings shown in FIGS. 5a–5c.
Figure 6B:
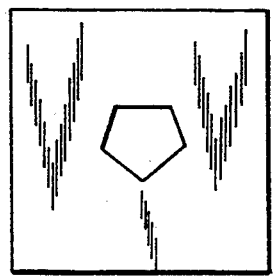
Figure 6C:
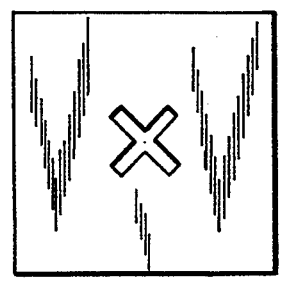

FIGS. 5a–5c show several examples of two-dimensional cross-sections of extrusion openings obtainable with the arrangement according to the invention, and FIGS. 6a–6c show masks used in the arrangement of FIG. 4 to obtain extrusion openings of shapes shown in FIGS. 5a–5c. The masks shown in FIGS. 6a–6c have cut-out areas corresponding to cross-sections of extrusion openings of the die inserts shown in FIGS. 5a–5c.

Although so illustrated, the extrusion openings need not have only geometric shapes or regular patterns. Any irregular shape which may be formed on the mask may be used to form a corresponding planar extrusion opening.

Moreover, complex three-dimensional extrusion openings are possible according to the present invention. By creating a sequence of masks to be positioned between the laser energy source and the workpiece, with the successive cut-out or unmasked areas becoming smaller in at least one direction, an opening is created whose cross section varies in the extruding direction. The use of the methods described herein to produce any of a limitless number of extrusion dies in this manner is contemplated by the inventors, even though the results obtainable by actual extrusion of various materials is bounded only by the imagination of the person creating the series or sequence of masks.

What is claimed is:

1. A method of producing an identification mark on a diamond gemstone, the method comprising the steps:

positioning a mask between an output of a source of laser energy in the ultraviolet range and a portion of a surface of the diamond gemstone to be identified; and placing the identification mark on the diamond gemstone by directly irradiating the portion of the surface of the diamond gemstone with the laser energy source through the mask so as to permit the radiation itself to create the identification mark in a pattern defined by the mask.

2. The method of claim 1, wherein the laser energy source irradiates the diamond gemstone with at least one energy pulse at a wavelength of about 193 nm.

3. The method of claim 1, wherein said step of irradiating includes passing the laser radiation through cut-out areas in the mask.

4. The method of claim 1, wherein said step of irradiating includes passing the laser radiation through areas of different transmissivities in the mask.

5. The method of claim 1, said mask being spaced away from the surface of the diamond gemstone.

6. The method of claim 1, said mask being directly on or adjacent the surface of the diamond gemstone.

7. The method of claim 1, said mask being imaged onto the surface of the diamond gemstone at a reduced size through means for optically reducing the mask pattern.

8. The method of claim 4, said mask being made of one of the group of materials which are substantially transmissive at the wavelength of the laser radiation, the group including fused quartz, silica and sapphire.

9. The method of claim 1, wherein the energy of the laser source is adjusted to remove only a thin layer from the surface of the diamond gemstone.

10. The method of claim 9, wherein said layer removed from said surface has a thickness ranging from approximately several angstroms to several microns.

11. The method of claim 1, wherein the entire identification mark is created while holding the diamond gemstone in a single fixed position.

12. The method of claim 1, including the step, before placing the identification mark on the diamond gemstone, of applying a coating of material to the surface of the diamond gemstone to be marked, which material is detectable only under predetermined lighting conditions.

13. The method of claim 12, wherein the material is a fluorescent material.

14. The method of claim 12, wherein the material is a phosphorescent material.

15. The method of claim 1 including the step, before placing the identification mark on the diamond gemstone, of applying a coating of material to the surface of the diamond gemstone to be marked, which material is optically or electrically or magnetically detectable.

16. The method of claim 15 wherein the material is molybdenum carbide, nickel carbide, titanium carbide or iron carbide.

17. The method of claim 1, comprising the further step of similarly directly irradiating at least a second portion of the diamond gemstone to form at least a second identification mark.

18. The method of claim 1, wherein the energy of the laser source is adjusted to partially transform a portion or the diamond gemstone from one form of elemental carbon to another form of elemental carbon.

19. The method of claim 1, wherein the energy of the laser source is adjusted to partially graphitize the diamond gemstone at the portion being marked.

20. The method of claim 19, wherein the darkness of the mark so produced varies with the degree of graphitization caused by the laser radiation.

21. A diamond gemstone bearing an identification mark, the identification mark produced in accordance with the method of claim 1.

22. A method of producing a marking on a diamond, the method comprising the steps:

positioning a mask between an output of a source of laser energy in the ultraviolet range and a portion of a surface of the diamond to be marked;

directly irradiating the portion of the surface of the diamond with the laser energy source through the mask so as to permit the radiation itself to create the mark in a pattern defined by the mask, said step of irradiating including passing the laser radiation through cut-out areas in the mask;, positioning a second mask between the output of the source of laser energy and a .second portion of the surface of the diamond to be marked, the second portion being a subset of the first portion of the surface of the diamond to be marked; and directly irradiating the second portion of the surface of the diamond with the laser energy source through the second mask so as to permit the radiation itself to create a second mark in a pattern defined by the second mask.

23. A diamond gemstone bearing an identification mark, the identification mark produced in accordance with the method of claim 22.

24. A method of manufacturing a die insert for use in an extrusion die, the die insert having a die extrusion opening therethrough, comprising the steps of:

providing a source of ultraviolet laser energy having an output;

positioning a mask having a cut-out area corresponding to a cross-section of the die extrusion opening, between the output of said source of ultraviolet laser energy and the die insert; and directing a beam from the output through said mask onto said die insert for producing the extrusion opening therein.

25. The method of claim 24, further comprising the step of positioning a reduction lens between said mask and the die insert.

26. The method of claim 24, further comprising the steps:

positioning a second mask having a different cut-out area corresponding to a second cross-section of the die extrusion opening between the output of said source of ultraviolet laser energy and the die insert; and directing a beam from the output through said second mask onto said die insert for producing the extrusion opening therein, wherein the cross-section of die extrusion opening varies in the direction in which material is to be extruded.

27. A method of identifying a diamond gemstone, comprising the steps of:

providing an ultraviolet laser having an output;

positioning a mask having a cut-out area corresponding to a predetermined identification mark to be placed on the diamond gemstone, between the output of said laser and the diamond gemstone;

positioning a reduction lens between said mask and the diamond gemstone; and placing the predetermined identification mark on the diamond gemstone by directing a beam from said laser output through said mask and through said reduction lens onto the diamond gemstone, whereby the predetermined identification mark is produced thereon.

28. A diamond gemstone bearing an identification mark, identification mark produced in accordance with the method of claim 27.

29. A die for extruding fibers, wires, filaments and the like having a complex cross-section, comprising a die insert made of diamond having an extrusion opening with a cross-section corresponding to the complex cross-section of the fiber, wire, filament and the like, the die insert being produced by directing an ultraviolet laser beam onto the die insert through a mask having a cut-out area corresponding to the cross-section of the extrusion opening and positioned between the excimer laser and the die insert.

30. A method of producing an identification mark on a pearl, precious or semi-precious stone, the method comprising the steps:

positioning a mask between an output of a source of laser energy in the ultraviolet range and a portion of a surface of the pearl, precious or semiprecious stone to be provided with the identification mark; and placing the identification mark on the pearl, precious or semi-precious stone by directly irradiating the portion of the surface of the pearl, precious or semiprecious stone with the laser energy source through the mask so as to permit the radiation itself to create the identification mark in a pattern defined by the mask, without at the same time causing microcracking of the surface of the pearl, precious or semi-precious stone.

31. A pearl, precious or semi-precious stone bearing an identification mark, the identification mark produced in accordance with the method of claim 30.

* * * * *